United States Patent
Ota et al.

(10) Patent No.: US 6,992,571 B2
(45) Date of Patent: Jan. 31, 2006

(54) SEATBELT-FASTENING PROMPTING APPARATUS

(75) Inventors: Katsuhisa Ota, Isehara (JP); Takashi Wagatsuma, Sagamihara (JP); Takayuki Honma, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 195 days.

(21) Appl. No.: 10/738,116

(22) Filed: Dec. 18, 2003

(65) Prior Publication Data

US 2004/0178901 A1    Sep. 16, 2004

(30) Foreign Application Priority Data

Dec. 19, 2002 (JP) ............................. 2002-368734
Nov. 27, 2003 (JP) ............................. 2003-397182

(51) Int. Cl.
*H04B 3/36*    (2006.01)

(52) U.S. Cl. ................. 340/407.1; 340/425.5; 340/438; 340/439; 340/457.1

(58) Field of Classification Search ............. 340/407.1, 340/425.5, 438, 439, 457.1, 457
See application file for complete search history.

(56) References Cited

U.S. PATENT DOCUMENTS

| | | | |
|---|---|---|---|
| 5,574,641 A * | 11/1996 | Kawakami et al. ............ | 701/1 |
| 5,605,202 A * | 2/1997 | Dixon ........................ | 180/268 |
| 6,459,365 B2 * | 10/2002 | Tamura .................... | 340/425.5 |
| 6,796,567 B2 * | 9/2004 | Shimizu et al. ........ | 280/93.502 |

FOREIGN PATENT DOCUMENTS

JP    2002-211357 A    7/2002

* cited by examiner

*Primary Examiner*—Daryl C Pope
(74) *Attorney, Agent, or Firm*—Foley & Lardner LLP

(57) ABSTRACT

A seatbelt-fastening prompting apparatus which includes; a seatbelt fastening detector for detecting whether a seatbelt is fastened or unfastened; a vibrator for vibrating a steering wheel; and a controller for activating the vibrator when an ignition switch is turned on and the seatbelt fastening detector detects the seatbelt as being unfastened.

15 Claims, 10 Drawing Sheets

STOPPED / RUNNING / STARTING
SEATBELT FASTENED
PARKING BRAKE APPLIED

NO VIBRATION

STOPPED
SEATBELT UNFASTENED
PARKING BRAKE APPLIED

STARTING

RUNNING

RUNNING

SEATBELT-FASTENING PROMPTING APPARATUS

BACKGROUND OF THE INVENTION

1. Field of the Invention

The present invention relates to a seatbelt-fastening prompting apparatus.

2. Description of the Related Art

In general, a warning lamp or the like is provided on an instrument panel for prompting or urging a driver/passenger in a vehicle to pay attention to an unfastened seatbelt. However, the driver/passenger tends to have low alertness regarding fastening the seatbelt because the warning lamp is not highly visible, resulting in a lowered percentage of drivers/passengers fastening their seatbelts.

Japanese Patent Application Laid-Open No. 2002-211357 discloses an apparatus for prompting a passenger to fasten a seatbelt using a sound warning or warning image display when a vehicle is in motion (running) with the passenger remaining unbelted.

SUMMARY OF THE INVENTION

However, in an apparatus as described above, an unfastening state of the seatbelt is only notified using sound warning or warning image display, and the driver/passenger is not made firmly aware thereof.

The present invention was made in the light of this problem. An object of the present invention is to provide a seatbelt-fastening prompting apparatus, which is capable of making a driver and/or passenger firmly aware of the fact that their seatbelts should be fastened.

An aspect of the present invention is a seatbelt-fastening prompting apparatus, comprising: a seatbelt fastening detector for detecting whether a seatbelt is fastened or unfastened; a vibrator for vibrating a steering wheel; and a controller for activating the vibrator when an ignition switch is turned on and the seatbelt fastening detector detects the seatbelt as being unfastened.

BRIEF DESCRIPTION OF THE DRAWINGS

The invention will now be described with reference to the accompanying drawings wherein.

DETAILED DESCRIPTION OF THE PREFERRED EMBODIMENTS

Figure 1:
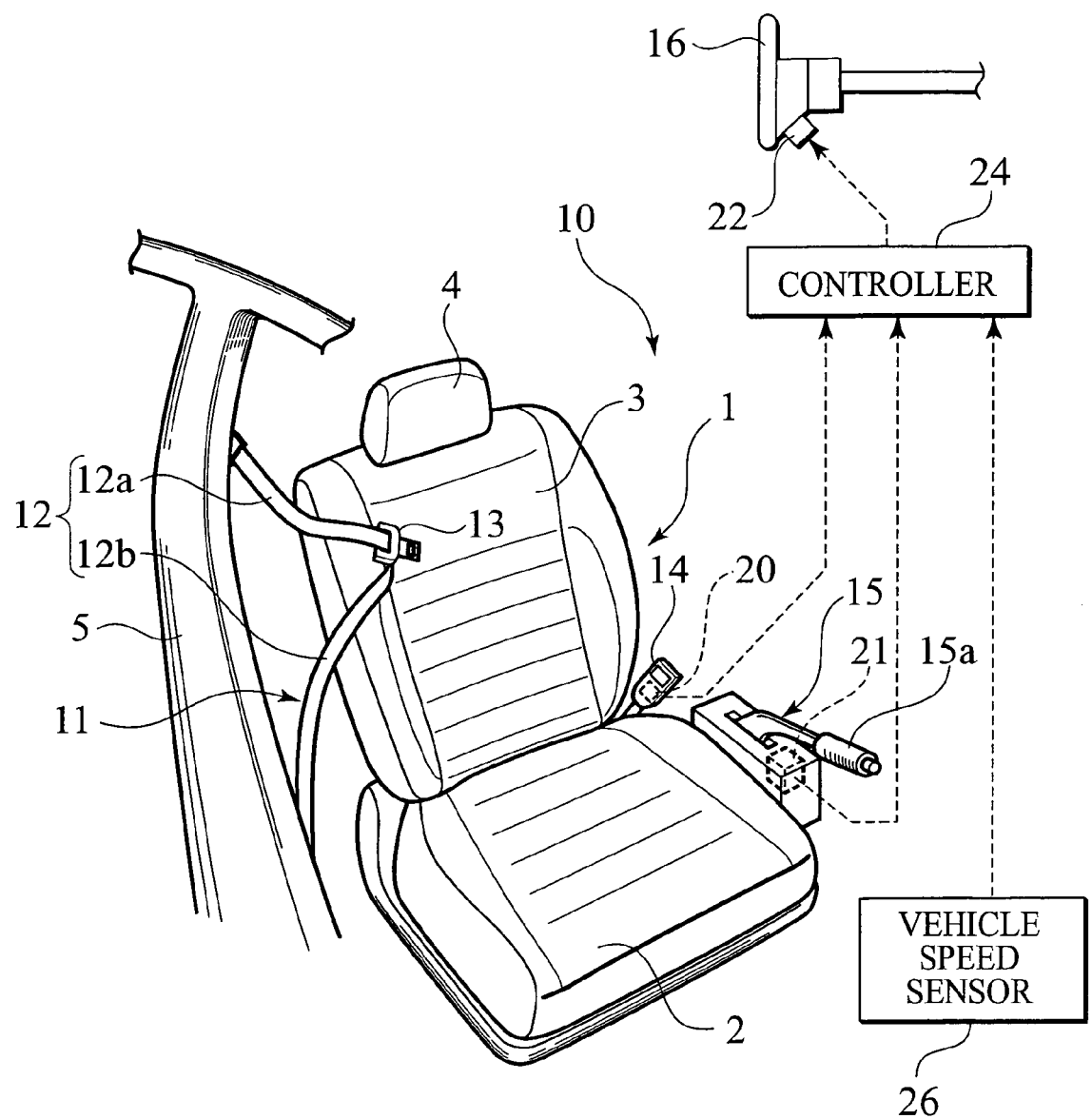
FIG. 1 is a perspective view of a seat and a seatbelt for a vehicle in a seatbelt-fastening prompting apparatus according to a first embodiment of the present invention.

Embodiments of the present invention will be explained below with reference to the drawings, wherein like members are designated by like reference characters.

As shown in FIG. 1, a seatbelt-fastening prompting apparatus 10 of a first embodiment is applied to a seatbelt 11 provided in a vehicle seat 1.

The vehicle seat 1 includes a seat cushion 2 for supporting the weight of a driver or passenger (not shown) in the seat 1, a seat back 3 for supporting the back of the driver or passenger, and a headrest 4 attached to the central part of the upper end of the seat back 3.

The seatbelt 11 includes a webbing 12 which restrains the driver or passenger, a tongue 13 through which the webbing 12 is inserted and fixed at a predetermined position thereof, and a buckle 14 which detachably attaches the tongue 13 thereto.

One end (upper end in FIG. 1) of the webbing 12 is movably supported on an upper portion of a pillar 5 located in the vicinity of one side (left side in FIG. 1) of the seat back 3. This end of the webbing 12, beyond the supported portion, is inserted through the pillar 5 and wound up by and retracted in a retractor (not shown) housed in the pillar 5. The other end (lower end in FIG. 1) of the webbing 12 is coupled to a lower end of the pillar 5.

When using the seatbelt 11, the tongue 13 is pulled, and thus the webbing 12 is unwound from the retractor and fed out from the pillar 5. Then, the tongue 13 is attached to the buckle 14 provided on a lower end on the other side (right side in FIG. 1) of the seat back 3. In such a way, a portion 12a of the webbing 12, which is on upper side of the tongue 13, r strains the driver/passenger from his/her shoulder diagonally downward, and a portion 12b of the webbing 12, which is on lower side of the tongue 13, restrains the waist of the driver/passenger.

Figure 2:
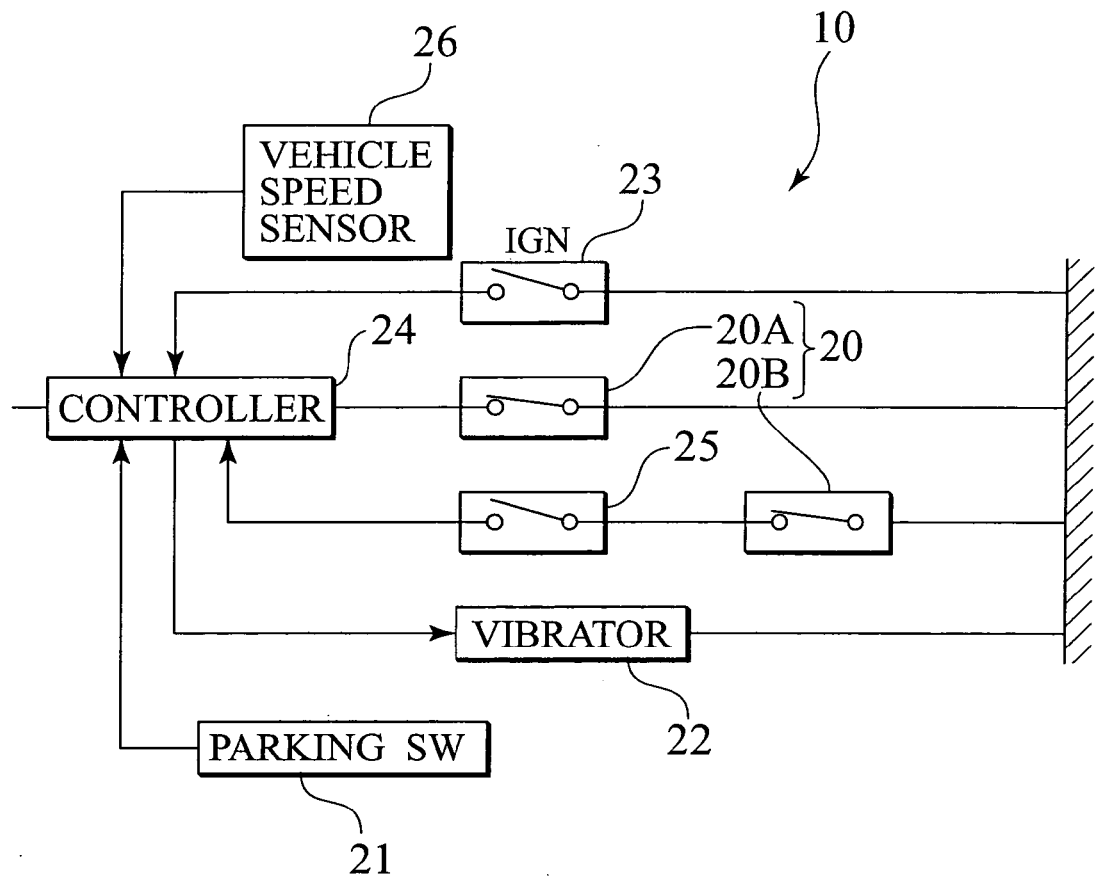
FIG. 2 is a system diagram of the seatbelt-fastening prompting apparatus in FIG. 1.

Here, as shown in FIGS. 1 and 2, the seatbelt-fastening prompting apparatus 10 of this embodiment includes: a buckle switch 20, as a seatbelt fastening detector for detecting whether the seatbelt 11 is fastened or unfastened; a parking switch 21, as a parking brake detector for detecting whether a parking brake 15 is applied or released; a vibrator 22, as a vibrator for vibrating a steering wheel 16 (refer to FIG. 3); and a controller 24, as a controller for activating the vibrator 22 when the seatbelt 11 is unfastened while a ignition switch 23 is turned on and the parking brake 15 is released.

In the first embodiment, the seatbelt-fastening prompting apparatus 10 is configured for an application where two seatbelts 11 should be installed: one being installed in a driver's seat; and the other being installed in another seat in which a passenger is seated, such as a passenger's seat. As shown in FIG. 2, a driver's seat buckle switch 20A and a passenger's seat buckle switch 20B are connected to the controller 24 in parallel. The passenger's seat buckle switch 20B is connected to the controller 24 in series with a seating sensor 25 which detects whether or not the passenger is seated in the passenger's seat.

Figure 4:
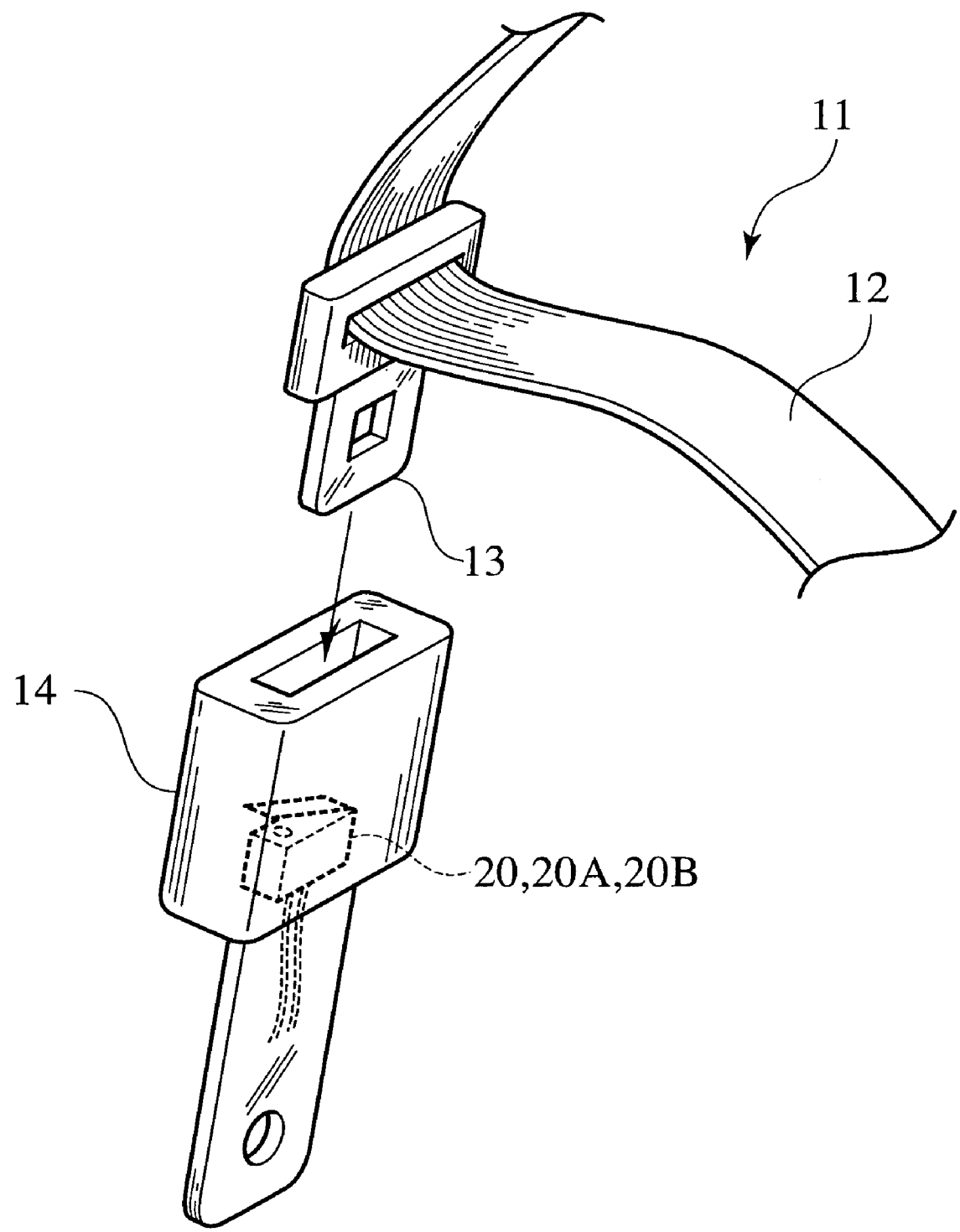
FIG. 4 is a perspective view of a tongue and a buckle of the seatbelt of the seatbelt-fastening prompting apparatus in FIG. 1.

The buckle switches 20A and 20B are normally-closed-type switches, respectively. Each buckle switch is switched on when the seatbelt 11 is unfastened with the tongue 13 thereof released from the buckle 14 as shown in FIG. 4. Meanwhile, each buckle switch is switched off when the seatbelt 11 is fastened with the tongue 13 thereof inserted into the buckle 14 and engaged therewith.

The parking switch 21 outputs an ON signal when the parking lever 15a is pulled up for braking, and an OFF signal when the parking lever 15a is returned for releasing the brake.

The seating sensor 25 is a normally-open-type switch. The seating sensor 25 is switched on when a passenger is seated in the passenger's seat, to enable a signal to be sent from the passenger's seat buckle switch 20B to the controller 24.

Figure 3:
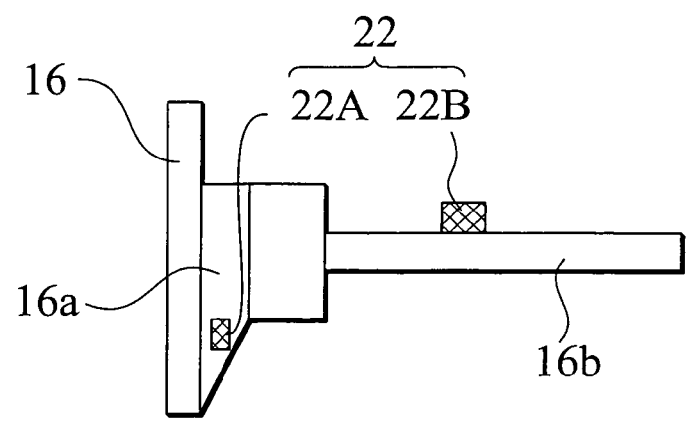
FIG. 3 is a side view of principal portions of a steering wheel, a steering column, and a steering wheel spoke provided with a vibrator, of the seatbelt-fastening prompting apparatus in FIG. 1.

The vibrator 22 is constituted of a first vibrator 22A attached to a spoke 16a of the steering wheel 16 and a second vibrator 22B attached to the steering column 16b thereof as shown in FIG. 3. These first and second vibrators 22A and 22B are activated simultaneously by operation signals sent from the controller 24.

Then, as shown in FIG. 2, the ON or OFF signals from the ignition switch 23, driver's seat buckle switch 20A, passenger's seat buckle switch 20B and parking switch 21 are independently inputted to the controller 24. Furthermore, a signal of the vehicle speed V from a vehicle speed sensor 26 is also inputted thereto independently. Based on these input signals, it is determined whether or not the operation signals are to be sent to the first and second vibrators 22A and 22B.

In the first embodiment, the operation signals are sent to the first and second vibrators 22A and 22B if the seatbelt 11 is unfastened on at least one of the driver's or passenger's seats, specifically, if any one of the driver's seat buckle switch 20A and the passenger's seat buckle switch 20B is switched on, while the seating sensor 25 is switched on by a passenger being seated in the passenger's seat.

Moreover, the controller 24 activates the first and second vibrators 22A and 22B intermittently whilst the vehicle is stopped, and continuously after the start thereof.

The control executed repeatedly for each short fixed time by the controller 24 will be described with reference to the control flowchart of FIG. 5. First, if, in Step S1, the ignition switch 23 is switched on to start the engine, and if, in Step S2, the parking switch 21 is OFF, which means the brake is released, and if, in Step S3, the normal-close-type driver's seat buckle switch 20A is ON, which means the seatbelt 11 is unfastened, operation signals for intermittent operation are sent to the first and second vibrators 22A and 22B in Step S4.

On the other hand, if, in Stop S3, the driver's seat buckle switch 20A is OFF, which means the seatbelt 11 is fastened, and if, in Step S5, the seating sensor 25 on the passenger's seat is ON, which means a passenger is seated therein, and if, in Step S6, the passenger's seat buckle switch 20B is ON, which means the seatbelt 11 is unfastened, the control proceeds to the foregoing Step S4.

That is, through the controls of Steps S3 to S6, when the seatbelt 11 of any one of the driver's s at and the passenger's seat is unfastened, the first and second vibrators 22A and 22B are made to generate intermittent vibrations by the operation signals, whereby the steering wheel 16 is vibrated intermittently.

Next, if, in Step S7, the vehicle speed sensor 26 indicates the vehicle speed V≠0, which means the vehicle is in motion (running), operation signals for continuous vibration are sent to the first and second vibrators 22A and 22B in Step S8, and thus the steering wheel 16 is vibrated continuously.

Note that the control is ended without proceeding to another step when the ignition switch 23 is turned OFF in Step S1. If, in Step S2, the parking switch 21 is ON, which means the brake is applied, or if, in Step S5, the seating sensor 25 is OFF, which means the seat is not occupied, or if, in Step S6, the passenger's seat buckle switch 20B is OFF, which means the seatbelt 11 is fastened, the control returns to Step S1. Moreover, if, in Step S7, the indicated vehicle speed V is equal to zero, which means the vehicle is stopped, the control returns to Step S4.

The operation signals sent to the first and second vibrators 22A and 22B are stopped if the seatbelt 11 of the driver's seat is fastened and the passenger's seat is not occupied, or if the seatbelt 11 of the driver's seat is fastened, a passenger is seated in the passenger's seat, and the seatbelt 11 of the passenger's seat is fastened.

With the above-described configuration, in the seatbelt-fastening prompting apparatus 10 of the first embodiment, if th ignition switch 23 is turned on, and the parking brake 15 is released to enable the vehicle to start, when the driver seated in the driver's seat and the passenger seated in the passenger's seat have not fastened their seatbelts 11, the controller 24 activates the first and second vibrators 22A and 22B to forcibly vibrate the steering wheel 16. Therefore, the driver gripping the steering wheel 16 is forcibly and physically alerted via his hands. Accordingly, the driver becomes acutely aware that the seatbelt 11 should be fastened in order to eliminate this sense of discomfort. This contributes to an increased percentage of drivers/passengers fastening their seatbelts 11.

When the driver fastens the seatbelt 11 but the passenger in the passenger's seat does not fasten the seatbelt 11, the driver is given a sense of discomfort by the vibrations of the steering wheel 16. In this case, the driver has the passenger in the passenger's seat fasten the seatbelt 11, to stop the vibrations of the steering wheel 16.

When the passenger's seat is not occupied, it only depends on whether the driver fastens the seatbelt 11 or not, to determine whether or not the vibrations are to applied to the steering wheel 16.

While the steering wheel 16 is forcibly vibrated in accordance with the unfastening of the seatbelt 11 as described above, it Is desirable to intensify the vibrations as much as possible within a range where the maneuvering of the vehicle Is not affected.

Moreover, in an emergency case where the driver has to start the vehicle without fastening the seatbelt 11, the seatbelt-fastening prompting apparatus 10 of this embodiment allows the driver to maneuver the vehicle, wherein the driver only needs to ignore the sense of discomfort due to the vibrations of the steering wheel 16.

In addition to the above-described effect of this embodiment, in consideration of the respective seatbelts 11 installed on the driver's seat and the passenger's seat, the first and second vibrators 22A and 22B are configured to be activated if any one of the driver in the driver's seat and the passenger in the passenger's seat do not fasten their seatbelt 11. Therefore, the driver can be effectively prompted to have the passenger in the passenger's seat fasten the seatbelt 11.

Moreover, the first and second vibrators 22A and 22B are configured to be activated intermittently whilst the vehicle is stopped, and continuously after the start thereof. Therefore, while the steering wheel 16 is vibrated intermittently whilst the vehicle is stopped, to moderately prompt seatbelt-fastening, the steering wheel 16 is vibrated continuously during the running of the vehicle to strongly prompt seatbelt-fastening, thus the seatbelt 11 is forced to be fastened.

Further, in the first embodiment, the steering wheel 16 is vibrated in various amplitudes and patterns of vibration, as shown in FIGS. 6A to 6D, which are controlled to be changed depending on respective conditions to thereby maintain a high alertness of the driver to the vibrations.

Figure 6A:
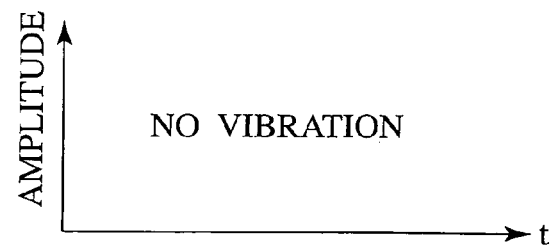
FIGS. 6A to 6E show various patterns of vibration generated by the vibrator of the seatbelt-fastening prompting apparatus in FIG. 1.

Specifically, as shown in FIG. 6A, no vibration is set to be applied, if the parking switch 21 is ON, which means the parking brake 15 is applied, and the buckle switch 20 is OFF, which means the seatbelt 11 is fastened, when the vehicle is stopped, in motion (running), or starting.

Figure 6B:
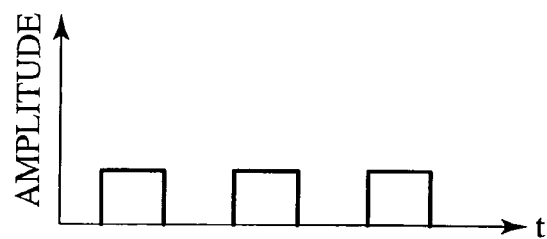
Figure 6C:
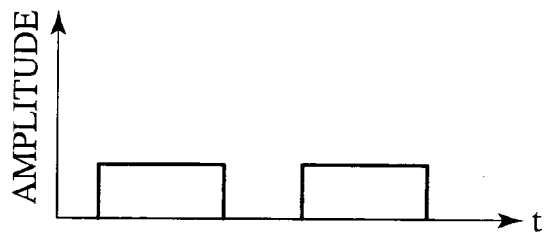

Moreover, as shown in FIG. 6B, intermittent short vibrations are set to be applied, if the buckle switch 20 is ON, which means the seatbelt 11 is unfastened, and the parking switch 21 is ON, which means the parking brake 15 is applied, when the vehicle is stopped. Furthermore, as shown In FIG. 6C, intermittent long vibrations are set to be applied, if the vehicle starts with the seatbelt 11 unfastened. Still further, as shown in FIG. 6D, continuous vibration is set to be applied, if the vehicle is in motion with the seatbelt 11 unfastened.

Figure 6D:
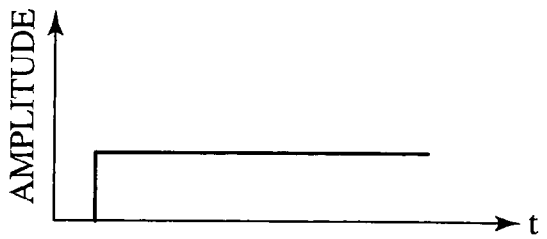
Figure 6E:
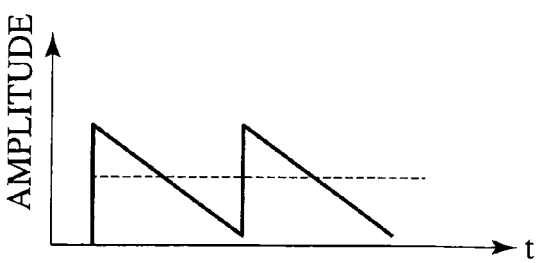

A continuous vibration with its amplitude changing in sawtooth waveform shown in FIG. 6E may be applied in place of the continuous vibrations with a constant amplitude of FIG. 6D, Note that the present invention can be applied to seatbelts of a rear seat, or exclusively to the seatbelt of the driver's seat. Moreover, although in this first embodiment, the vibrator 22 is constituted of the first and second vibrators 22A and 22B, the vibrator 22 can be constituted of one vibrator or three or more vibrators, as long as the vibrators are attached to regions from which the steering wheel 16 is efficiently vibrated.

Figure 7:
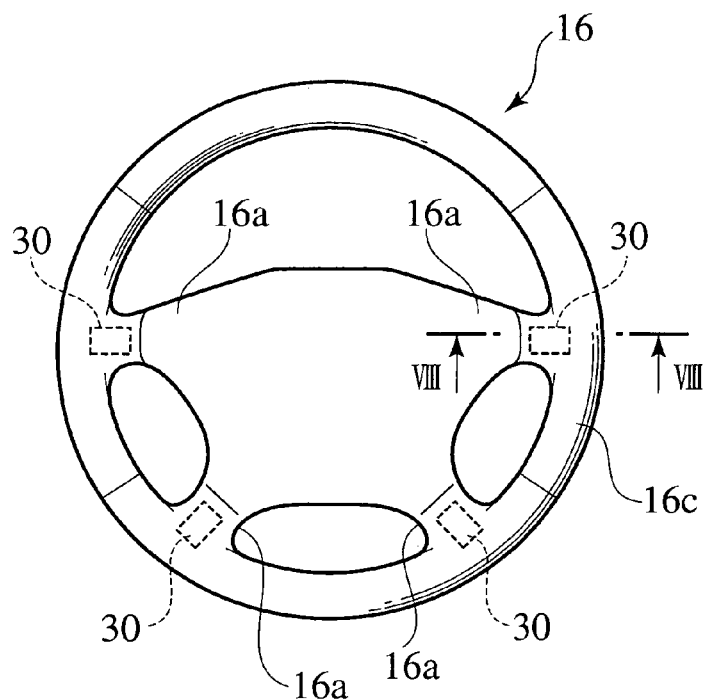
FIG. 7 is a plan view of a steering wheel of a seatbelt-fastening prompting apparatus according to a second embodiment of the present invention.
Figure 8:
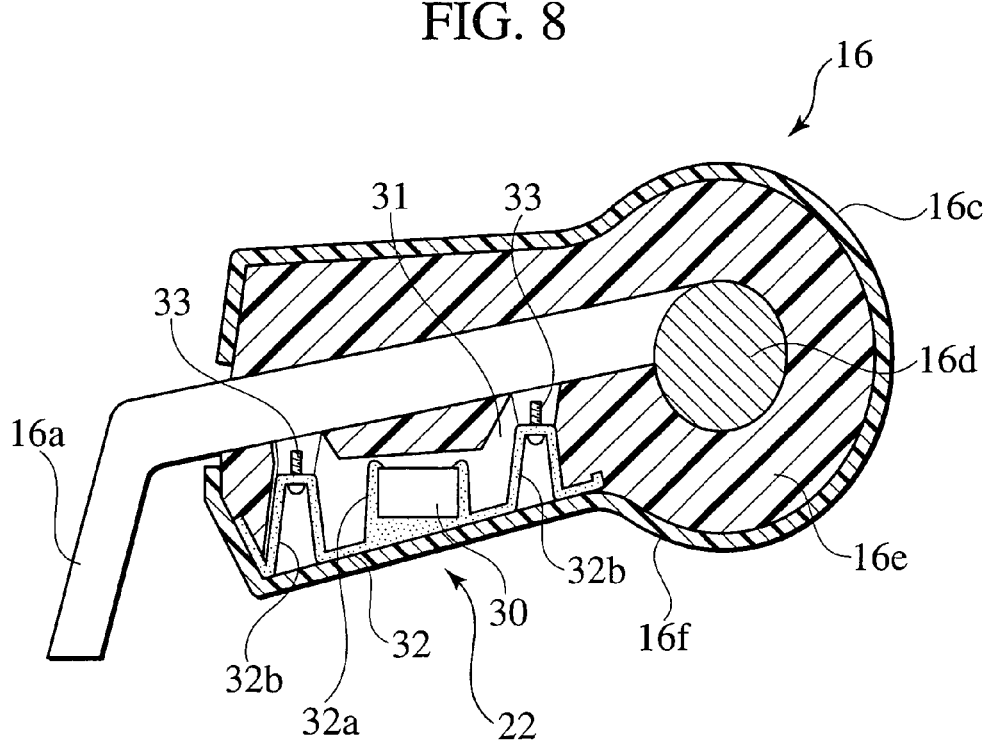
FIG. 8 is an enlarged cross-sectional view of the steering wheel of FIG. 7, taken along a line VIII—VIII of FIG. 7.

FIGS. 7 and 8 show a second embodiment of the present invention, wherein like members as those in the above-described embodiment are designated by like reference characters and repeated description will be omitted.

In this second embodiment, as shown in FIG. 7, a vibrator 22 includes vibrating elements 30 for partially vibrating a steering wheel 16.

A plurality of the vibrating elements 30 (four pieces in this embodiment) are provided, each of which is arranged on a part of the steering wheel 16. Specifically, the vibrating elements 30 are arranged in four spots near the joints where four spokes 16a meet a wheel body 16c and are configured to partially vibrate parts of the steering wheel 16 on the four spots.

As shown in FIG. 8, each of the vibrating elements 30 is accommodated in a recess 31 formed in a foamed material 16e which is an inner material covering a core member 16d of the steering wheel 16, and is held by a bracket 32 which is in contact with a back surface of a cover material 16f covering the foamed material 16e. Whereby the vibration generated by the vibrating element 30 is transmitted through the bracket 32 to the part of the cover material 16f which is in contact with the bracket 32.

In this embodiment, the bracket 32 is formed of a relatively harder material through which the vibrations are easily transmitted, and the vibrating element 30 is attached to a holding portion 32a formed in a center portion of the bracket 32. Moreover, the bracket 32 is formed to have, in a periphery of the holding portion 32a, a plurality of attachment portions 32b which are projected to the opposite side of the cover material 16f. These attachment portions 32b are fastened to the spoke 16a by screws 33.

Moreover, in this embodiment, at least one of the vibrating elements 30, thus arranged in the plurality of spots of the steering wheel 16, is controlled to be activated.

The vibrating element 30 to be activated is selected based on a vehicle speed V detected by a vehicle speed sensor 26.

According to the second embodiment, the vibrator 22 is constituted of the plurality of the vibrating elements 30 each of which partially vibrates the steering wheel 16. The vibrator 22 can be smaller in size in comparison with the case of vibrating the whole of the steering wheel 16. The structure of the apparatus is thus simplified and the weight thereof becomes lighter.

Moreover, in the case of continuously vibrating the whole of the steering wheel 16, the vibrations generated by the vibrator 22 are prone to be confused with normal vibrations transmitted through the vehicle body, and the prompting of the driver to fasten a seatbelt is disturbed. In this embodiment, the steering wheel 16 is partially vibrated. Accordingly, the vibrations generated by the vibrating elements 30 are easily distinguishable from the vibrations transmitted through the vehicle body. Moreover, in this embodiment, the steering wheel 16 can be intermittently vibrated, whereby the vibrations become more distinguishable.

Furthermore, each of the vibrating elements 30 is accommodated in the recess 31 formed in the foamed material 16e of the steering wheel 16, and is held by the bracket 32 which is in contact with the back surface of the cover material 16f. The vibrations generated by the vibrating elements 30 are transmitted through the bracket 32 to the parts in contact therewith of the cover material 16f. Thus, the vibrating elements 30 can be arranged in grip portions of the steering wheel 16, which are to be gripped by the driver who easily senses the vibrations and maintains his/her increased alertness thereto. Each of the vibrating elements 30 is small enough to be accommodated in such a small space provided inside the steering wheel 16, therefore the good appearance of the steering wheel 16 is maintained.

Still further, the plurality of vibrating elements 30 are arranged in the plurality of spots on the steering wheel 16, and at least one thereof is controlled to be vibrated selectively depending on the detected vehicle speed V. Accordingly, it becomes possible to flexibly and efficiently select the regions of the steering wheel 16 to be vibrated, and the driver can be made firmly aware that the seatbelt 11 is unfastened.

Figure 9:
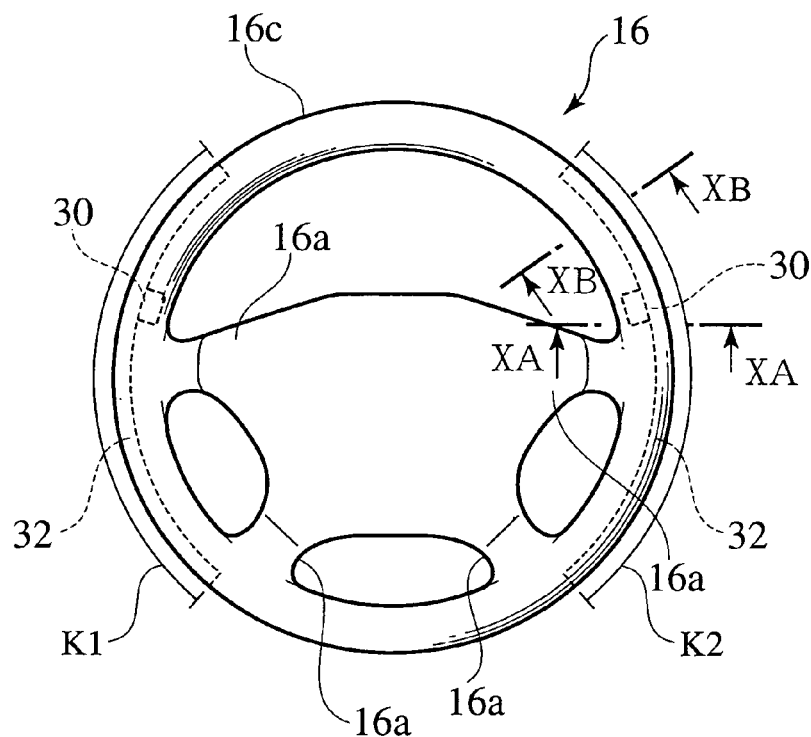
FIG. 9 is a plan view of a first modification example of a steering wheel of the seatbelt-fastening prompting apparatus according to the second embodiment.

FIGS. 9 and 10 show a first modification example of the second embodiment, wherein like members as those in the second embodiment are designated by like reference characters and repeated description will be omitted.

Figure 10A:
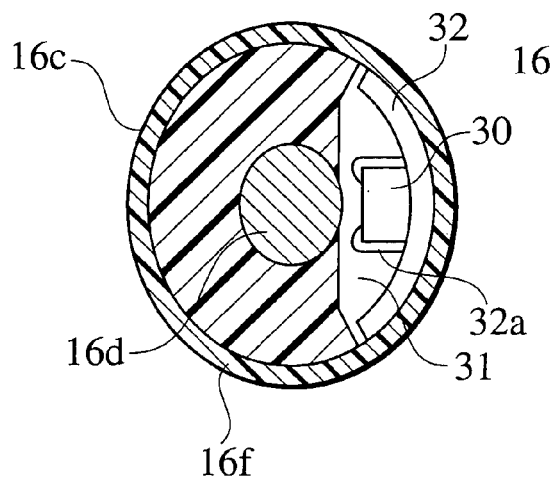
FIGS. 10A and 10B are enlarged cross-sectional views of the steering wheel of FIG. 9, taken along lines XA—XA and XB—XB of FIG. 9, respectively.
Figure 10B:
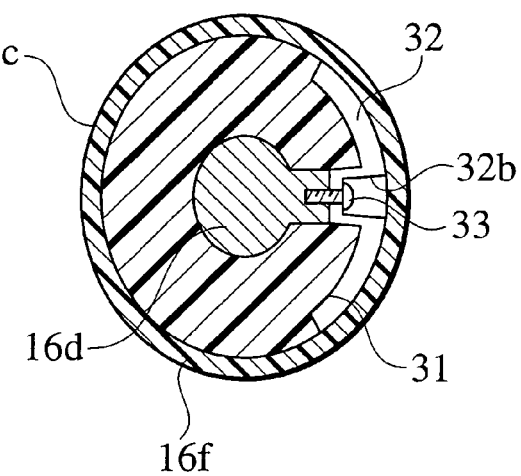

In this first modification example, as shown in FIG. 9, vibrating elements 30 are respectively arranged inside a right grip range portion K1 and a left grip range portion K2 in grip ranges on both right and left sides of the steering wheel 16, which the driver grips to steer the vehicle in normal drive. As shown in FIGS. 10A and 10B, each of brackets 32 is formed into a circular arc shape along the respective right and left grip range portions K1 and K2.

A basic structure of each of the brackets 32 is similar to that of the second embodiment, although a whole shape of the bracket 32 is different from that of the second embodiment. In this first modification example, each of the brackets 32 is brought into contact with a back surface of a cover material 16f.

According to the first modification example, the brackets 32 are formed into the circular arc shape which covers a wide range of the steering wheel 16 along the grip range portions K1 and K2 thereof. Therefore, the number of vibrating elements 30 can be reduced.

Figure 11:
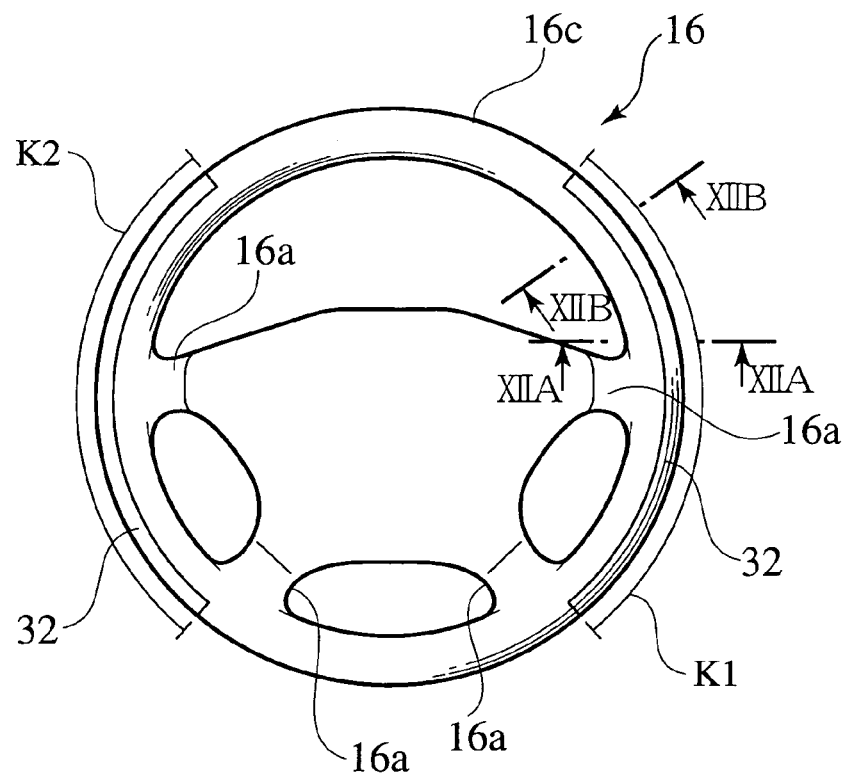
FIG. 11 is a plan view of a second modification example of a steering wheel of the seatbelt-fastening prompting apparatus according to the second embodiment.
Figure 12A:
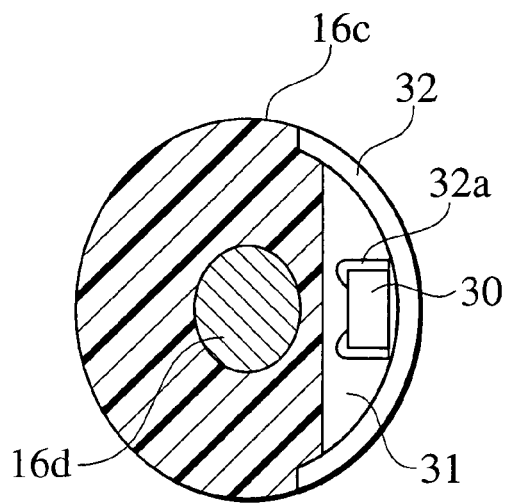
FIGS. 12A and 12B are enlarged cross-sectional views of the steering wheel of FIG. 11, taken along lines XIIA—XIIA and XIIB—XIIB of FIG. 11, respectively.
Figure 12B:
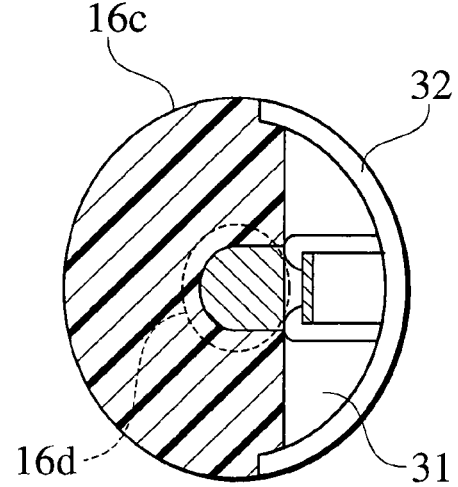

FIGS. 11, 12A and 12B show a second modification example of the second embodiment, wherein like members as those of the first modification example are designated by like reference characters and repeated description will be omitted.

The second modification example is one applied to a steering wheel 16 for which a cover material is not used. Brackets 32 are formed in a circular arc shape along a right grip range portion K1 and a left grip range portion K2 of the steering wheel 16 similarly to the first modification example. Particularly, in the second modification example, the brackets 32 are made attachable in a single step to the steering wheel 16 together with the vibrating elements 30 integrated, and are exposed in the grip ranges of the steering wheel 16.

Figure 13:
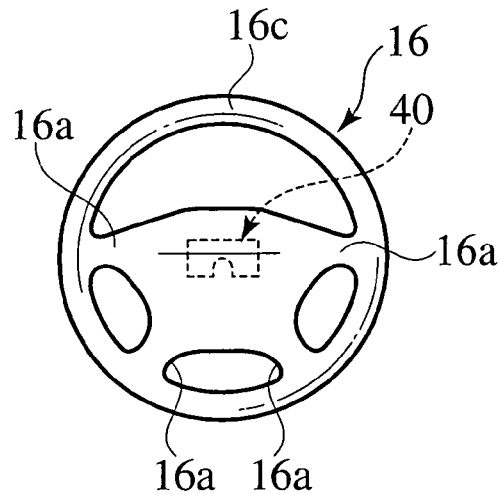
FIG. 13 is a plan view of a steering wheel of a seatbelt-fastening prompting apparatus according to a third embodiment of the present invention.
Figure 14:
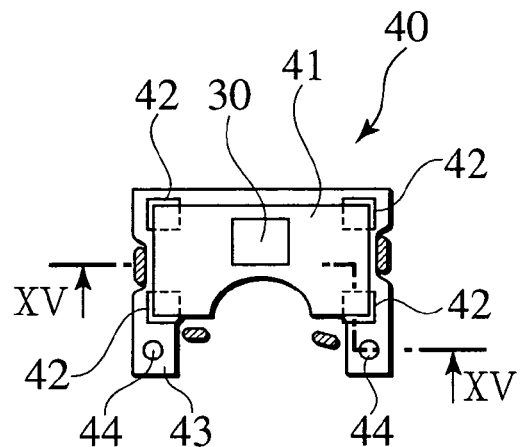
FIG. 14 is a plan view of a dynamic damper provided in the steering wheel of FIG. 13.
Figure 15:
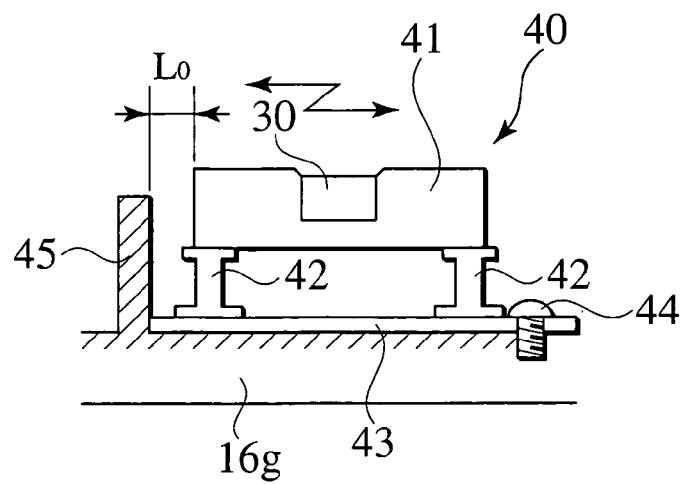
FIG. 15 is an enlarged cross-sectional view of the dynamic damper of FIG. 14, taken along a line XV—XV of FIG. 14.

FIGS. 13 to 15 show a third embodiment of the present invention, wherein like members as those in the first embodiment are designated by like reference characters and repeated description will be omitted.

In the third embodiment, as shown in FIGS. 13 and 14, the steering wheel 16 is provided with a dynamic damper 40 which has a vibrating element 30 embedded in a mass 41 thereof. When the embedded vibrating element 30 is activated, the mass 41 oscillates to interfere with the steering wheel 16, thereby generating an interference sound.

Specifically, some types of vehicles are provided with the dynamic damper 40 attached on a center part of the steering wheel 16, in order to suppress vibrations of the steering wheel 16. As shown in FIG. 15, the mass 41 of the dynamic damper 40 is mounted on a base plate 43 which is fixed to a core 16g of the steering wheel 16 with bolts 44, and supported thereon with flexible supports 42 so as to be freely movable to oscillate in a direction parallel to the base plate 43.

Cancellation/damping of vibrations of the steering wheel 16 is achieved by the mass 41 oscillating in a phase shifted from a phase of the vibration inputted to the steering wheel 16.

Further, in this embodiment, the vibrating element 30 is embedded in a center part of the mass 41, and the core 16g of the steering wheel 16 is formed to have a rib 45 protruded therefrom, which is spaced from the mass 41 at a predetermined interval L0, and positioned to be interfered with by the mass 41 when the vibrating element 30 is activated to scillate the mass 41.

The interval L0 is set to be within a range between L1 and L2: L1<L0<L2, where L1 is an amplitude of the oscillation of the mass 41 when the mass 41 receives the vibrations from the steering wheel 16, and L2 is an amplitude of the vibration of the mass 41 when the vibrating element 30 is activated. Thus, the mass 41 does not interfere with the rib 45 in its usual oscillation for canceling/damping the vibrations of the steering wheel 16, but does interfere therewith when the vibrating element 30 is activated.

According to the third embodiment, the mass 41 interferes with the rib 45 to generate a loud interference sound, which prompts the driver to fasten the seatbelt 11, enhancing the driver's awareness of the need to fasten the seatbelt 11.

Moreover, for an application of the third embodiment to a vehicle having a dynamic damper in a steering wheel, the dynamic damper can be changed to an alarm sound (interference sound) generator, simply by providing the dynamic damper with the vibrating element 30; accordingly, the number of parts can be reduced, and the structure thereof is simplified.

Figure 16:
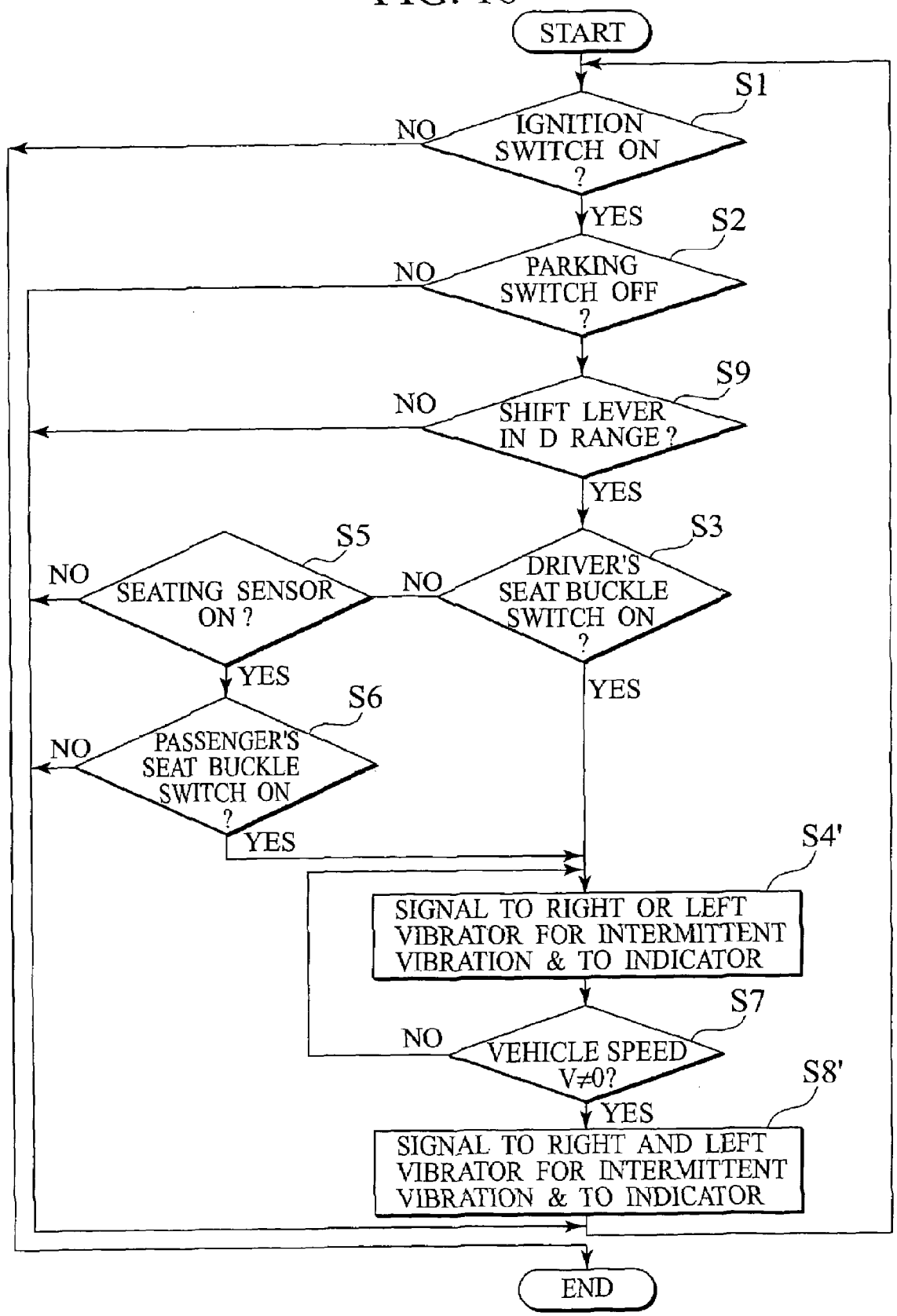
FIG. 16 is a control flowchart of a seatbelt-fastening prompting apparatus according to a fourth embodiment of the present invention.

FIG. 16 shows a fourth embodiment of the present invention, wherein like members as those in the first embodiment are designated by like reference characters and repeated description will be omitted.

Figure 5:
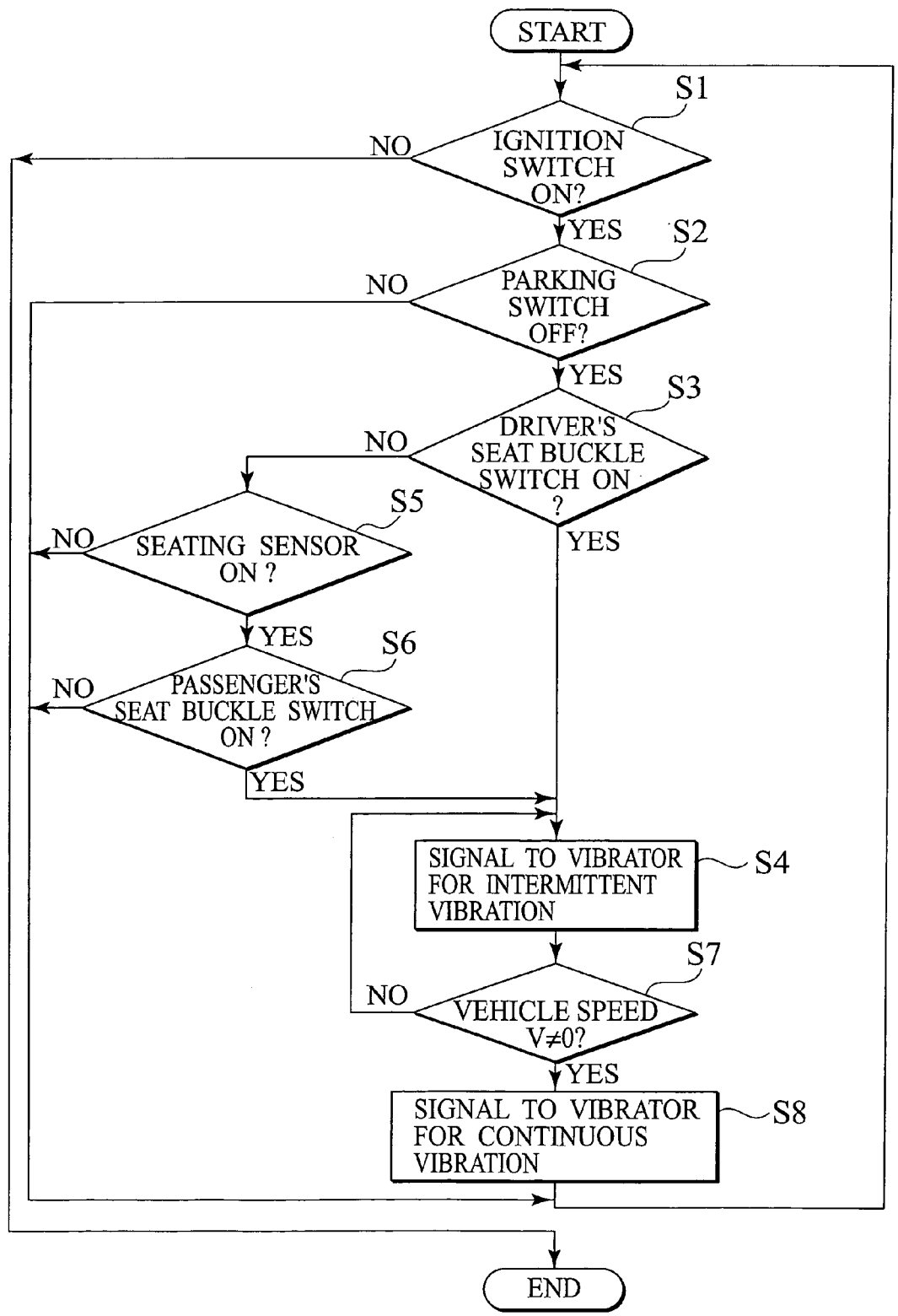
FIG. 5 is a control flowchart of the seatbelt-fastening prompting apparatus in FIG. 1.

In the first embodiment, the parking switch 21 is provided to detect whether the parking brake is applied or released, and the vibrator 22 is controlled to be activated when the parking brake 15 is released and the seatbelt 11 is unfastened (refer to FIG. 5). In the fourth embodiment, a gear range detector is provided to detect in which gear range a transmission is set, and a controller 24 is inputted gear range information sent from the gear range detector, which is used for the control of the vibrator 22.

Specifically, in the fourth embodiment, as shown in the flowchart of FIG. 16, the gear range detector is provided in addition to the parking switch 21, and the vibrator 22 is controlled to be activated if the parking switch 21 detects the parking brake 15 is released, the gear range detector detects the transmission shifted to a drive range (D range), and the buckle switch 20 detects the seatbelt 11 as being unfastened.

The control flowchart of FIG. 16 will be described below, wherein like processes as those of the flowchart of FIG. 5 are designated by like step numbers, referring to FIGS. 1 and 4.

First, if it is determined, in Step S1, that the ignition switch 23 is turned ON, in Step S2, that the parking switch 21 is OFF, which means the brake is released, in Step S9, that the transmission is set in D range, and in Step S3, that the driver's seat buckle switch 20A is ON, which means the seatbelt 11 is unfastened, then, in Step S4', the operation signals for the intermittent operation are sent to one of the first and second vibrators 22A and 22B. In this embodiment, the first and second vibrators 22A and 22B are provided on the right and left sides of the steering wheel 16, respectively. Note that the D range may be a forward speed gear range which includes a second gear range, a first gear range and the like.

Meanwhile, if it is determined, in the foregoing Step S3, that the driver's seat buckle switch 20A is OFF, which means the seatbelt 11 of the driver's seat is fastened, in Step S5, that the seating sensor 25 of the passenger's seat is ON, which means the passenger's seat is occupied, and in Step S6, that the passenger's seat buckle switch 20B is ON, which means the seatbelt 11 of the passenger's seat is unfastened, then the control proceeds to the foregoing Step S4'.

Next, if it is determined in Step S7 that the signal of the vehicle speed V from the vehicle speed sensor 26 is not equal to 0 (V≠0), which means the vehicle is running, then, in Step S8', the operation signals for the continuous operation are sent to the first and second vibrators 22A and 22B, and thus the vibrator 22 is vibrated continuously.

Moreover, similarly to the first embodiment, if it is determined that the ignition switch 23 is OFF in Step S2, the control is ended. If It is determined in Step S2 that the parking switch 21 is ON, which means the brake is applied, in Step S9, that the transmission is shifted to gear ranges other than the D range, in Step S5, that the seating sensor 25 is OFF, which means the passenger's seat is not occupied, and in Step S6, that the passenger's seat buckle switch 20B is OFF, which means the seatbelt 11 thereof is fastened, then the control returns to Step S1. Furthermore, if it is determined in Step S7 that the vehicle speed is equal to 0 (V=0), which means the vehicle is stopped, the control returns to Step S4.

Furthermore, in this embodiment, in the control executed in the foregoing Steps S4' and S8', operation signals for intermittent vibration are sent to the vibrator 22 and to the indicator, to perform an alarm operation such as blinking.

Moreover, when the plurality of vibrating elements 30 are provided as described in the second embodiment, the vibrating elements 30 can be controlled to be alternately activated between the right and left sides of the steering wheel 16.

The preferred embodiments and variety of modification examples described herein are illustrative and not restrictive, and the invention may be practiced or embodied in other ways without departing from the spirit or essential character thereof. For example, the present invention can be applied not only to the seatbelts 11 of the driver's seat and passenger's seat, but also to seatbelts of a rear seat.

Moreover, though the vibrator 22 is constituted of two vibrators, the first and second vibrators 22A and 22B, the vibrator can be of one, three or more vibrators. In any case, the vibrator will be attached to a spot from which the steering wheel 16 can be vibrated efficiently.

The scope of the invention being indicated by the claims, and all variations which come within the meaning of claims are intended to be embraced herein.

The present disclosure relates to subject matters contained in Japanese Patent Application No. 2002-368734, filed on Dec. 19, 2002, and Japanese Patent Application No. 2003-397182, filed on Nov. 27, 2003, the disclosures of which are expressly incorporated herein by reference in its entirety.

What is claimed is:

1. A seatbelt-fastening prompting apparatus, comprising:
    a seatbelt fastening detector for detecting whether a seatbelt is fastened or unfastened;
    a vibrator for vibrating a steering wheel; and
    a controller for activating the vibrator when an ignition switch is turned on and the seatbelt fastening detector detects the seatbelt as being unfastened.

2. The seatbelt-fastening prompting apparatus according to claim 1, wherein the vibrator includes a vibrating element for partially vibrating the steering wheel.

3. The seatbelt-fastening prompting apparatus according to claim 2, wherein the vibrating element is accommodated in a recess formed in an inner material of the steering wheel, and is held by a bracket which is in contact with a back surface of a cover material covering the inner material, and vibrations generated by the vibrating element are transmitted through the bracket.

4. The seatbelt-fastening prompting apparatus according to claim 2, wherein a plurality of the vibrating elements are provided in a plurality of spots of the steering wheel, and at least one of the plurality of vibrating elements is selectively vibrated depending on a vehicle speed.

5. The seatbelt-fastening prompting apparatus according to claim 2, wherein the vibrating element is fixed to an oscillatable mass of a dynamic damper provided on the steering wheel, and the mass is configured to interfere with a part of the steering wheel when oscillated by the vibrating element and generate a sound.

6. The seatbelt-fastening prompting apparatus according to claim 1, further comprising:
    a parking brake detector for detecting whether a parking brake is applied or released,
    wherein the controller activates the vibrator when the ignition switch is turned on, the parking brake detector detects the parking brake as being released, and the seatbelt fastening detector detects the seatbelt as being unfastened.

7. The seatbelt-fastening prompting apparatus according to claim 1, further comprising:
    a parking brake detector for detecting whether a parking brake is applied or released; and
    a gear range detector for detecting whether a transmission is shifted to a drive range,
    wherein the controller activates the vibrator when the parking brake is released, the transmission is shifted to the drive range, and the seatbelt fastening detector detects the seatbelt as being unfastened.

8. The seatbelt-fastening prompting apparatus according to claim 1, wherein the controller activates the vibrator when the seatbelt fastening detector detects the seatbelt as being unfastened on at least one of seats with a driver or a passenger seated thereon.

9. The seatbelt-fastening prompting apparatus according to claim 1, wherein the controller activates the vibrator intermittently whilst a vehicle is stopped and continuously after start of the vehicle.

10. A method for prompting a seatbelt-fastening, comprising:
    detecting with a seatbelt fastening detector whether a seatbelt is fastened or unfastened;
    vibrating a steering wheel with a vibrator attached thereon; and
    controlling the vibrator to activate the vibrator when an ignition switch is turned on and the detector detects the seatbelt as being unfastened.

11. The method for prompting a seatbelt-fastening according to claim 10, further comprising:
    detecting with a parking brake detector whether a parking brake is applied or released,
    wherein the vibrator is controlled to be activated when the ignition switch is turned on, the detector detects the seatbelt as being unfastened, and the parking brake detector detects the parking brake as being released.

12. The method for prompting a seatbelt-fastening according to claim 10, wherein the vibrator is controlled to be activated when the seatbelt is unfastened on at least one of seats with a driver or a passenger seated thereon.

13. The method for prompting a seatbelt-fastening according to claim 10, wherein the vibrator is controlled to be activated when the seatbelt fastening detector detects the seatbelt as being unfastened on at least one of seats with a driver or a passenger seated thereon.

14. The method for prompting a seatbelt-fastening according to claim 10, wherein the vibrator is controlled to be activated intermittently whilst a vehicle is stopped and continuously after start of the vehicle.

15. A seatbelt-fastening prompting apparatus, comprising:
    detecting means for detecting whether a seatbelt is fastened or unfastened;
    vibrating means for vibrating a steering wheel; and
    controlling means for activating the vibrating means when an ignition switch is turned on and the seatbelt detecting means detects the seatbelt as being unfastened.

* * * * *